(12) United States Patent
Alghunaimi et al.

(10) Patent No.: US 11,078,589 B2
(45) Date of Patent: Aug. 3, 2021

(54) HYDROPHOBIC STAINLESS-STEEL COPPER-COATED MESH AND METHOD OF SYNTHESIZING SAME

(71) Applicants: Saudi Arabian Oil Company, Dhahran (SA); King Fahd University of Petroleum and Minerals, Dhahran (SA)

(72) Inventors: Fahd I. Alghunaimi, Dhahran (SA); Nadeem Baig, Dhahran (SA); Duaa Al Saeed, AlQatif (SA); Tawfik A. Saleh, Dhahran (SA)

(73) Assignees: Saudi Arabian Oil Company, Dhahran (SA); King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 16/553,749

(22) Filed: Aug. 28, 2019

(65) Prior Publication Data

US 2021/0062355 A1    Mar. 4, 2021

(51) Int. Cl.
*C25D 5/36* (2006.01)
*C25D 3/38* (2006.01)
(Continued)

(52) U.S. Cl.
CPC .................. *C25D 5/36* (2013.01); *C25D 3/38* (2013.01); *C25D 5/48* (2013.01); *C25D 7/00* (2013.01); *B01D 39/12* (2013.01); *C25D 11/34* (2013.01)

(58) Field of Classification Search
CPC ....................................................... C25D 9/06
(Continued)

(56) References Cited

U.S. PATENT DOCUMENTS

2008/0118772 A1* 5/2008 Doye .................... B08B 17/06
428/689
2011/0036493 A1* 2/2011 Kawamura .......... C25D 7/0614
156/272.8
(Continued)

FOREIGN PATENT DOCUMENTS

CN    104726875 A    6/2015
CN    107875674 A    4/2018
(Continued)

OTHER PUBLICATIONS

Machine translation of CN107875674 of Tai et al. (Year: 2018).*
(Continued)

*Primary Examiner* — Brian W Cohen
(74) *Attorney, Agent, or Firm* — Leason Ellis LLP

(57) ABSTRACT

Disclosed is a copper coated stainless-steel hydrophobic mesh and a method for synthesizing the hydrophobic mesh. In the method, a stainless-steel mesh is sonicated in a solution of acetone and ethanol, and then electroplated in a copper solution to form a copper coating on the surface of the mesh. The copper-coated stainless-steel mesh is treated with an oxidizing solution having an oxidizing potential applied to it. The mesh is then washed with water and dried. The copper-coated stainless-steel mesh is then immersed in a lauric acid solution. The mesh is then rinsed with ethanol to remove adsorbed lauric acid. After drying, the so-synthesized copper-coated stainless-steel hydrophobic mesh is characterized in that it has hydrophobic branches of lauric acid.

13 Claims, 14 Drawing Sheets

(51) Int. Cl.
*C25D 5/48* (2006.01)
*C25D 7/00* (2006.01)
*C25D 11/34* (2006.01)
*B01D 39/12* (2006.01)

(58) Field of Classification Search
USPC .................................. 205/171, 182, 111
See application file for complete search history.

(56) References Cited

U.S. PATENT DOCUMENTS

| | | |
|---|---|---|
| 2015/0258588 A1 | 9/2015 | Moon et al. |
| 2018/0178144 A1 | 6/2018 | Lu et al. |
| 2019/0226110 A1* | 7/2019 | Gupta ................ C25D 5/10 |

FOREIGN PATENT DOCUMENTS

| | | | |
|---|---|---|---|
| CN | 106929894 B | 12/2018 | |
| WO | WO-2015170987 A1 * | 11/2015 | ............. C25D 11/34 |

OTHER PUBLICATIONS

Liu, Yan, et al. "Bioinspired structured superhydrophobic and superoleophilic stainless steel mesh for efficient oil-water separation." Colloids and Surfaces A: Physicochemical and Engineering Aspects 500 (2016): 54-63.

Liu, Yan, et al. "A facile electrodeposition process for the fabrication of superhydrophobic and superoleophilic copper mesh for efficient oil-water separation." Industrial & Engineering Chemistry Research 55.10 (2016): 2704-2712.

Crick, Colin R., James A. Gibbins, and Ivan P. Parkin "Superhydrophobic polymer-coated copper-mesh; membranes for highly efficient oil-water separation." Journal of Materials Chemistry A 1.19 (2013): 5943-5948.

Wang, Huiquan, et al. "Porous Metal Filters and Membranes for Oil-Water Separation." Nanoscale research letters 13.1 (2018): 284. 14 pages.

Li, Jin-Jin, Yin-Ning Zhou, and Zheng-Hong Luo. "Mussel-inspired V-shaped copolymer coating for intelligent oil/water separation." Chemical Engineering Journal 322 (2017): 693-701.

Zhu, Jingfang, et al. "A robust duplex Cu/PDMS-coated mesh with superhydrophobic surface for applications in cleaning of spilled oil." RSC Advances 7.40 (2017): 25101-25108.

Li, Jian, et al. "A facile one-step spray-coating process for the fabrication of a superhydrophobic attapulgite coated mesh for use in oil/water separation." Rsc Advances 5.66 (2015): 53802-53808.

Cao, Huaijie, et al. "Preparation of superhydrophobic/oleophilic copper mesh for oil-water separation." Applied Surface Science 412 (2017): 599-605.

Cheng, Zhongjun, et al. "Janus Copper Mesh Film with Unidirectional Water Transportation Ability toward High Efficiency Oil/Water Separation." Chemistry—An Asian Journal 12.16 (2017): 2085-2092.

Ren, Guina, et al. "A superhydrophobic copper mesh as an advanced platform for oil-water separation." Applied Surface Science 428 (2018): 520-525.

Pan, Qinmin, Min Wang, and Hongbo Wang. "Separating small amount of water and hydrophobic solvents by novel superhydrophobic copper meshes." Applied Surface Science 254.18 (2008): 6002-6006.

Wang, Chuanxi, et al. "Facile approach in fabricating superhydrophobic and superoleophilic surface for water and oil mixture separation." ACS applied materials & interfaces 1.11 (2009): 2613-2617.

Zhang, Shugang, et al. "One-step synthesis of superhydrophobic and multifunctional nano copper-modified bio-polyurethane for controlled-release fertilizers with "multilayer air shields": new insight of improvement mechanism." Journal of Materials Chemistry A 7.16 (2019): 9503-9509.

Varshney, Priya, et al. "A facile modification of steel mesh for oil-water separation." New Journal of Chemistry 41.15 (2017): 7463-7471.

Deng, Wanshun, et al. "Eco-friendly preparation of robust superhydrophobic Cu (OH) 2 coating for self-cleaning, oil-water separation and oil sorption." Surface and Coatings Technology 325 (2017): 14-21.

Zhao, Yichao, et al. "Fabrication of durable copper plating superhydrophobic surface with improved corrosion resistance and oil-water separation properties." Applied Physics A 124.2 (2018): 193 (10 pages).

Wang, Huaiyuan, et al. "Toward Easily Enlarged Superhydrophobic Materials with Stain-Resistant, Oil-Water Separation and Anticorrosion Function by a Water-Based One-Step Electrodeposition Method." Industrial & Engineering Chemistry Research 56.4 (2017): 933-941.

International Search Report and Written Opinion in Corresponding PCT Application No. PCT/US2020/047730 dated Dec. 8, 2020. 29 pages.

* cited by examiner

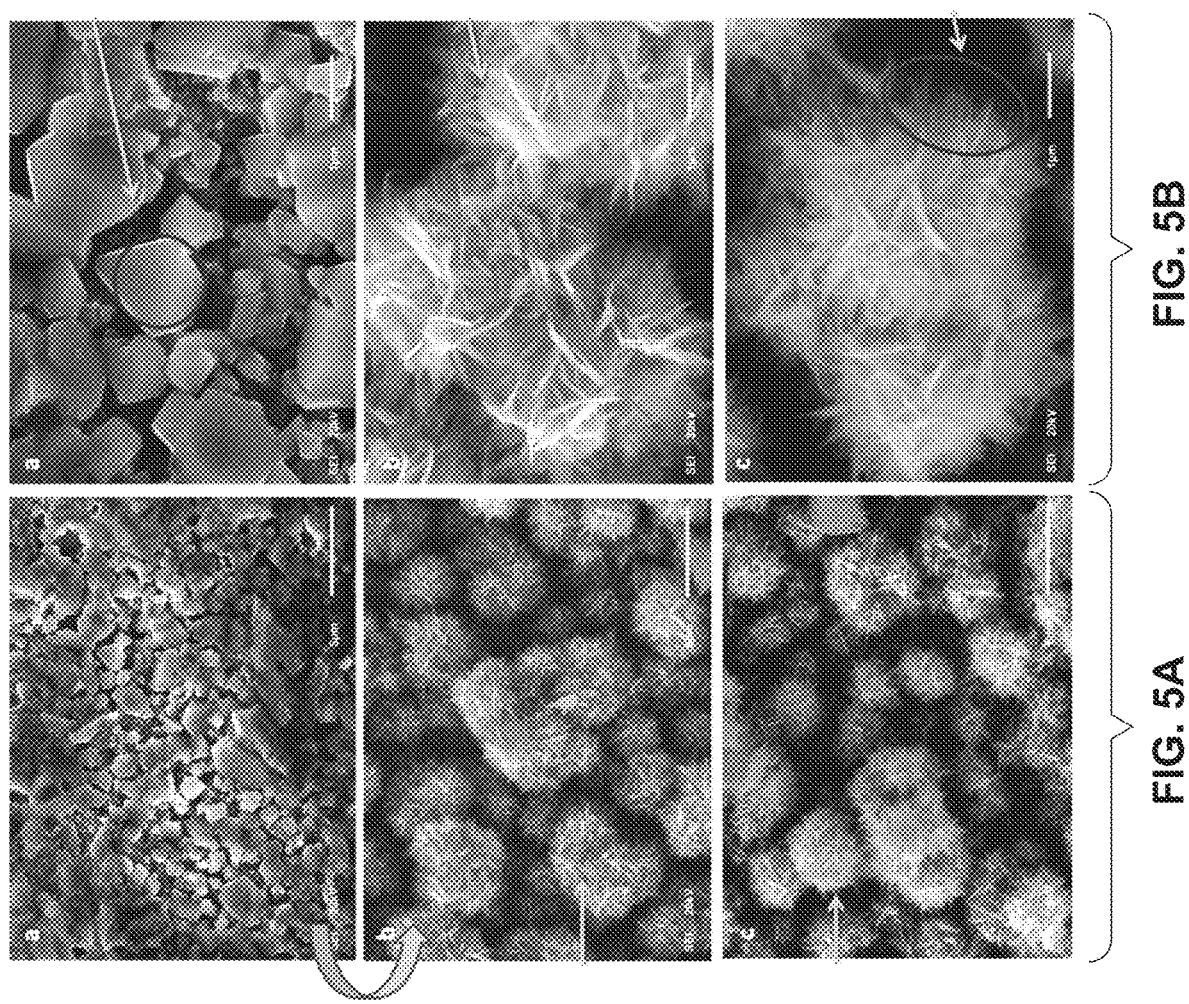

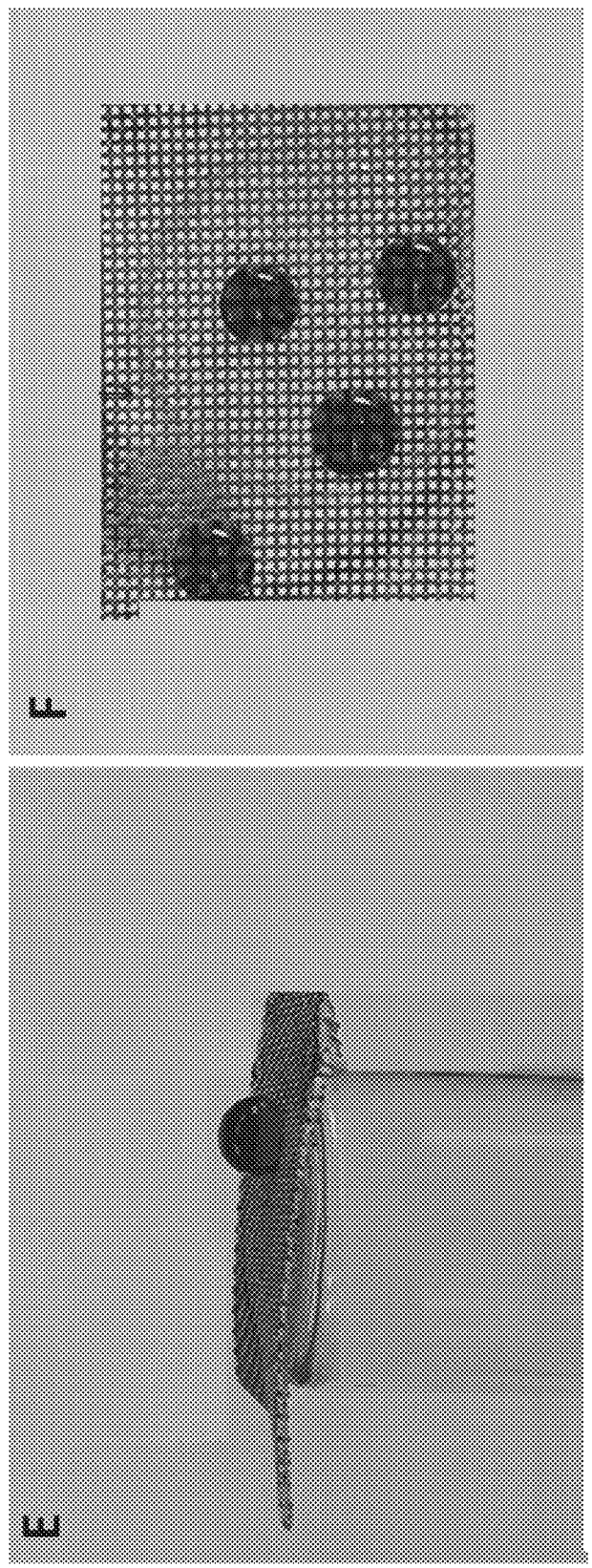

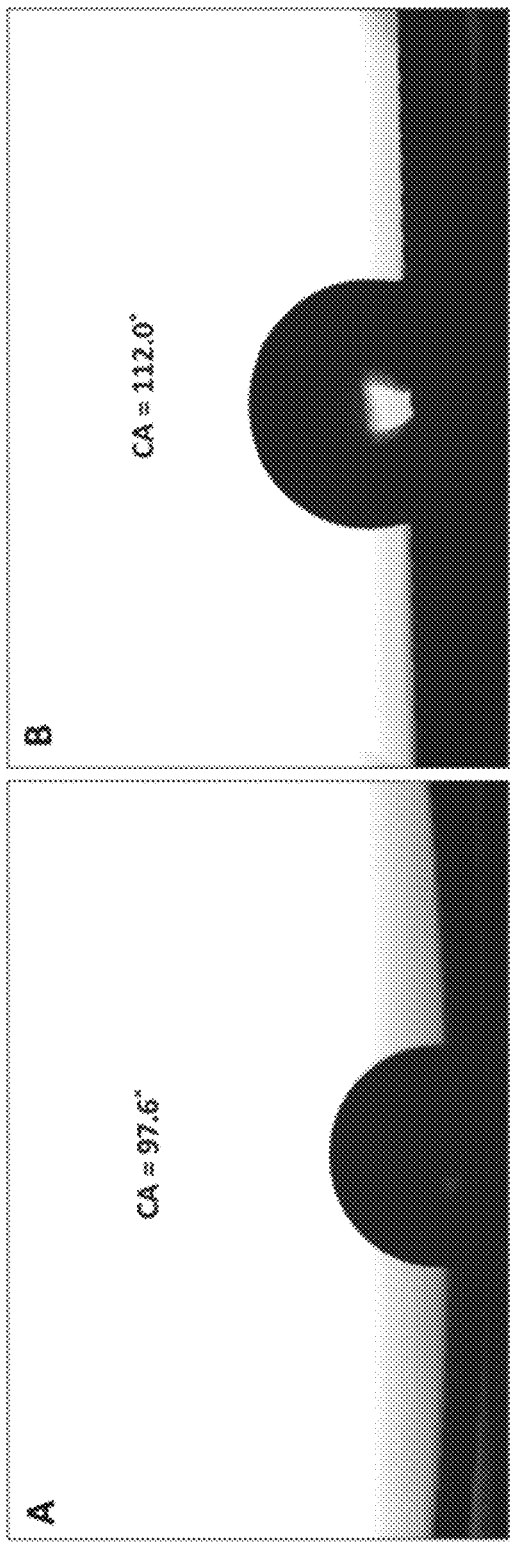
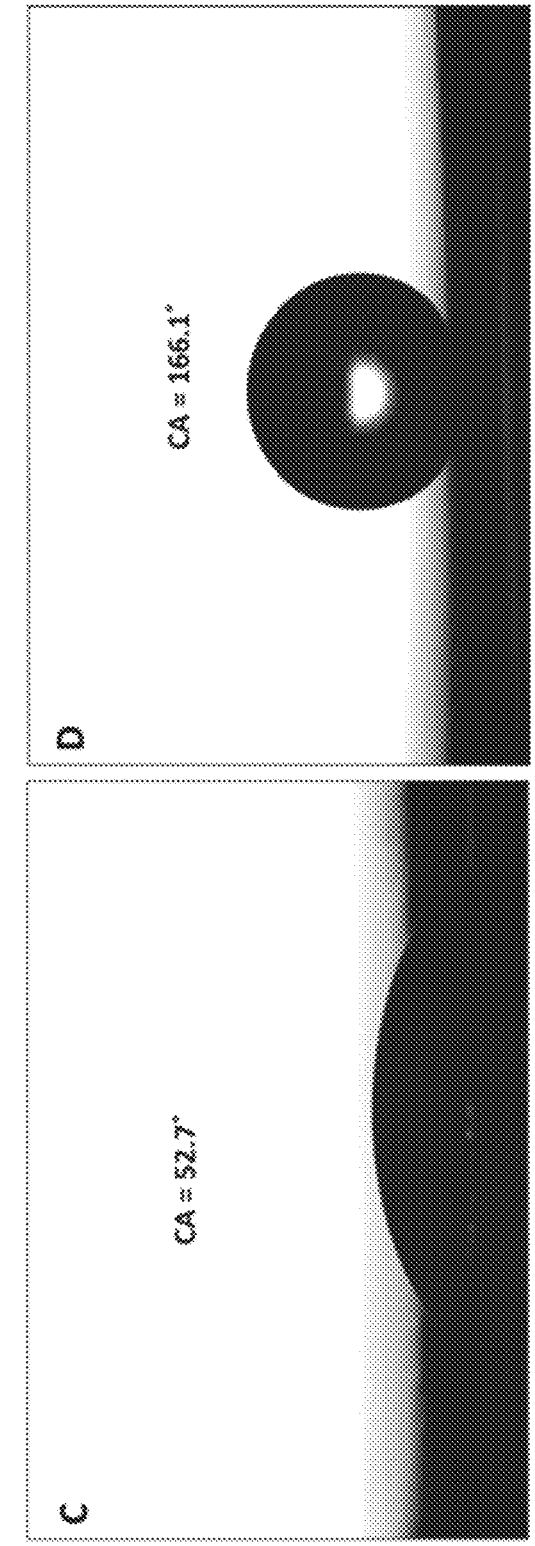
FIG. 11A
FIG. 11B
FIG. 11C
FIG. 11D

HYDROPHOBIC STAINLESS-STEEL COPPER-COATED MESH AND METHOD OF SYNTHESIZING SAME

TECHNICAL FIELD

The present disclosure is generally related to mesh constructions, and more particularly related to a mesh construction configured for oil/water separation and a method of making the mesh.

BACKGROUND OF THE DISCLOSURE

In the oil and gas industry, large quantities of water, such as produced water and salt water, are needed to maintain oil reservoirs and thus maintain the productivity of the oil wells. Produced water, however, generally includes oil contaminants, which can damage the formation around a wellbore, for example.

Conventional technologies for removing oil from water include gravity separation, air flotation, and flocculation-coagulation techniques. However, these technologies have many drawbacks including separation mechanism complexity, being energy-intensive, being inefficient, and having negative environmental impacts. As such, alternative methods are needed to overcome these challenges.

SUMMARY OF THE DISCLOSURE

In a first aspect a hydrophobic mesh is provided. The hydrophobic mesh includes a stainless-steel mesh and a copper coating, wherein the copper coating uniformly coats the surface of the stainless-steel mesh. Hydrophobic branches comprised of lauric acid extend from the surface of the stainless-steel mesh after immersing the mesh in lauric acid.

In another aspect, the hydrophobic mesh displays a water contact angle of approximately 160°, and more precisely 166.1°. In another aspect, the hydrophobic mesh has a separation efficiency for the separation of non-polar components from water of greater than 99%. In a further aspect, the non-polar components comprise hexane, heptane, nonane, and decane.

In another aspect, the hydrophobic mesh displays an architecture on its surface that comprises a plurality of functionalized copper growths each having a diameter of approximately 3 micrometers ($\mu m$) to approximately 40 $\mu m$.

In a second aspect, a method for synthesizing a hydrophobic mesh is provided. In the method, a stainless-steel mesh is sonicated in a solution of acetone and ethanol. The stainless-steel mesh is then electroplated in a copper solution to form a copper coating on the surface of the stainless-steel mesh. The copper-coated stainless-steel mesh is then treated with an oxidizing solution and an oxidizing potential is applied in the oxidizing solution. The copper-coated stainless-steel mesh is then washed with water and dried. The copper-coated stainless-steel mesh is then immersed in a lauric acid solution. The lauric acid treated, copper-coated stainless-steel mesh is rinsed with ethanol to remove adsorbed lauric acid. The copper-coated stainless-steel mesh is dried, and the formed hydrophobic mesh comprises hydrophobic branches of lauric acid.

In another aspect, the stainless-steel mesh is sonicated for approximately 10 minutes. In another aspect, the copper solution is a $CuSO_4$ solution. In another aspect, a potential of approximately 2.5 volts (V) to approximately 3.5V is applied to the copper solution during electroplating at a temperature of approximately 60° C. In another aspect, the application of potential during the electroplating step results in the formation of a plurality of functionalized copper growths on the surface of the stainless-steel mesh each having a diameter of approximately 3 $\mu m$ to approximately 40 $\mu m$.

In another aspect, the oxidizing potential is approximately 2V. In another aspect, wherein the oxidizing solution comprises $K_2SO_4$ and KOH. In yet another aspect, the oxidizing solution consists of 0.03M $K_2SO_4$ and 1M KOH. In another aspect, the lauric acid solution comprises 0.1M lauric acid solution in ethanol.

In another aspect, the copper-coated stainless-steel mesh is dried in an oven at approximately 50° C. In another aspect, treatment of the copper-coated stainless-steel mesh with the oxidizing solution resulted in a mesh having an architecture on its surface that comprises a plurality of copper oxide growths. In another aspect, the hydrophobic mesh displays a water contact angle of approximately 160°.

In another aspect, the hydrophobic mesh has a separation efficiency of greater than 99% for the separation of non-polar components from water. In a further aspect, the non-polar components comprise hexane, heptane, nonane, and decane.

BRIEF DESCRIPTION OF THE DRAWING FIGURES

FIG. 1 displays a flow diagram which illustrates a broad aspect of the method for synthesizing a superhydrophobic mesh of the present disclosure in accordance with one or more embodiments;

Figure 4:
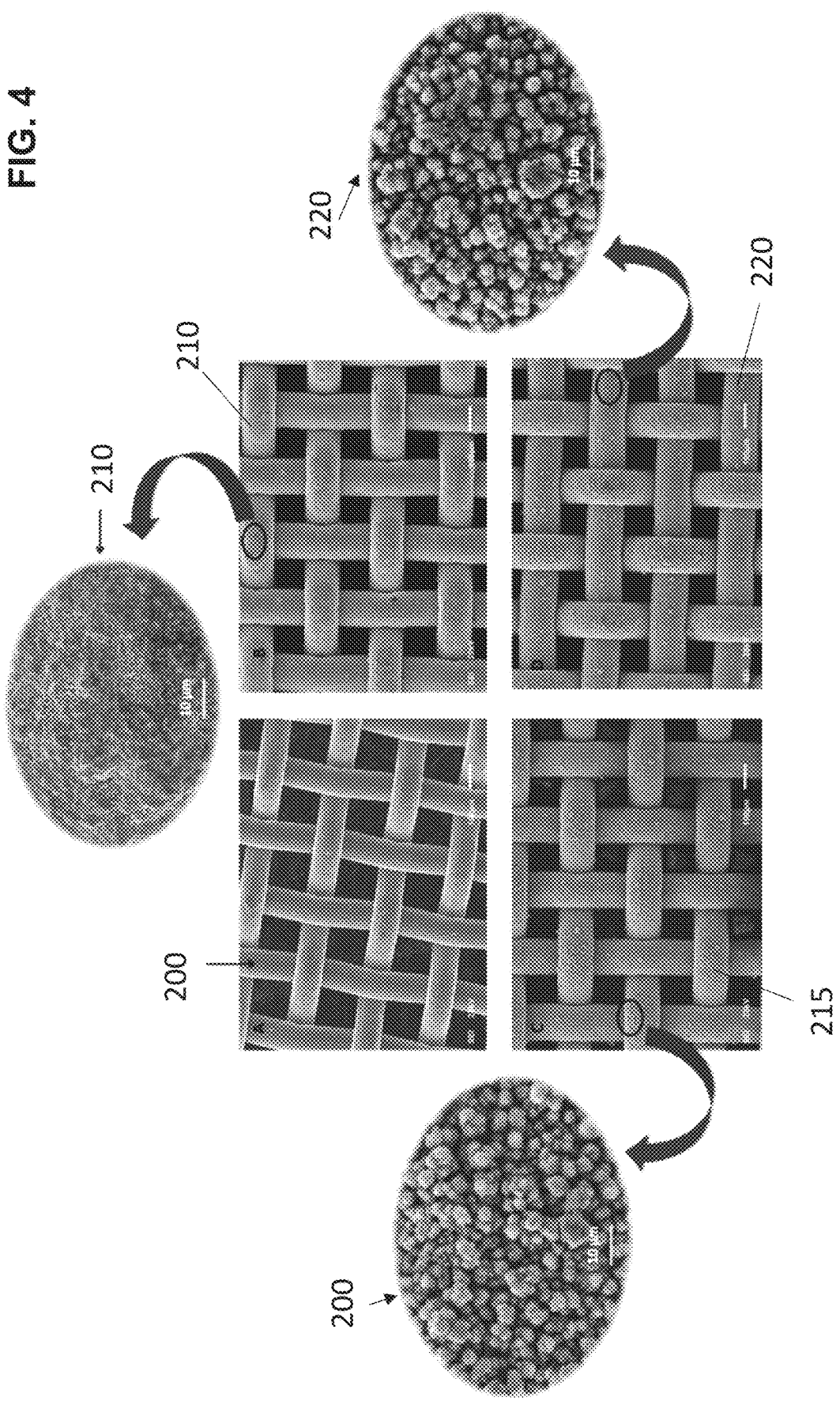
Figures 8A, 8B:
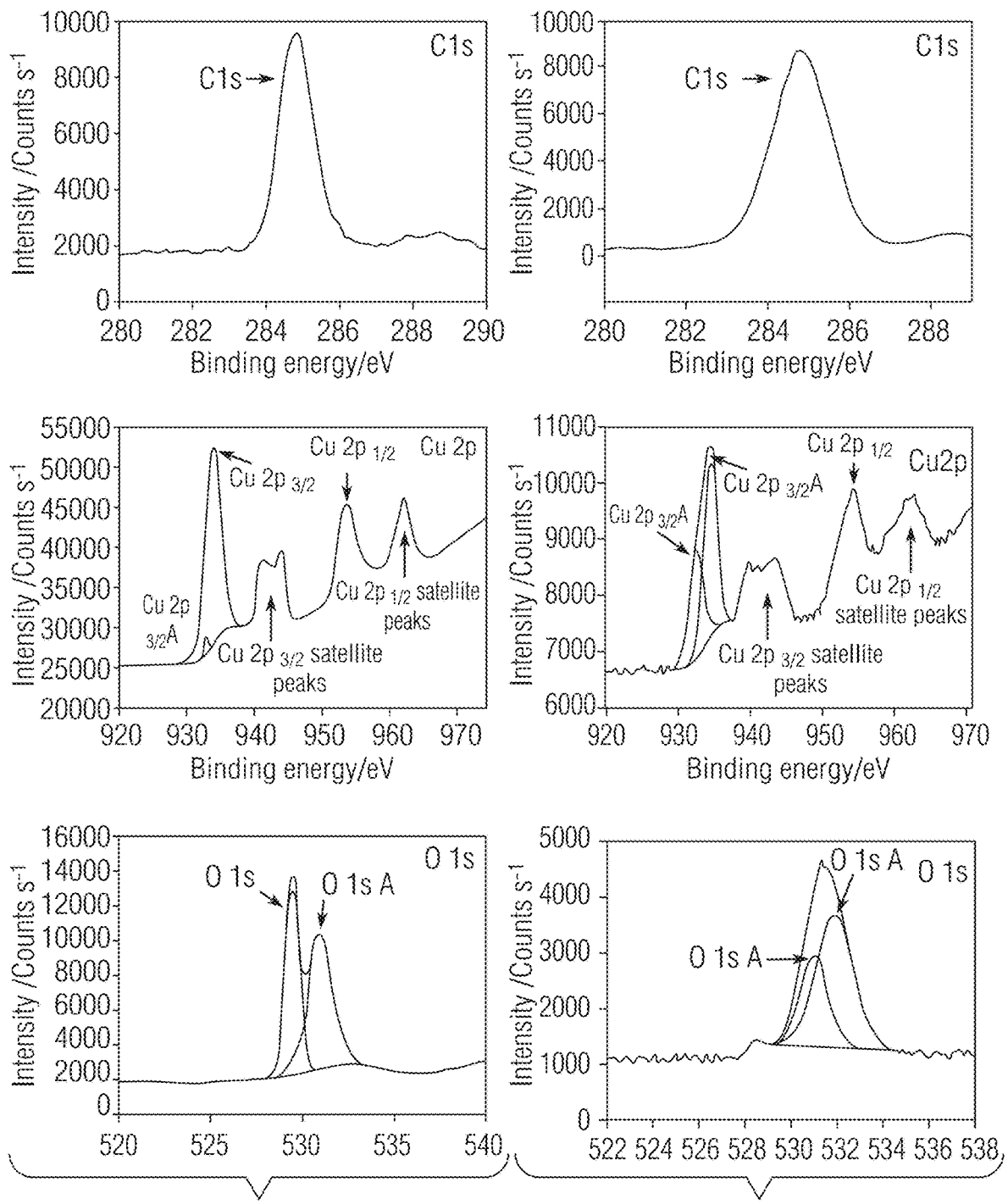
Figure 9:
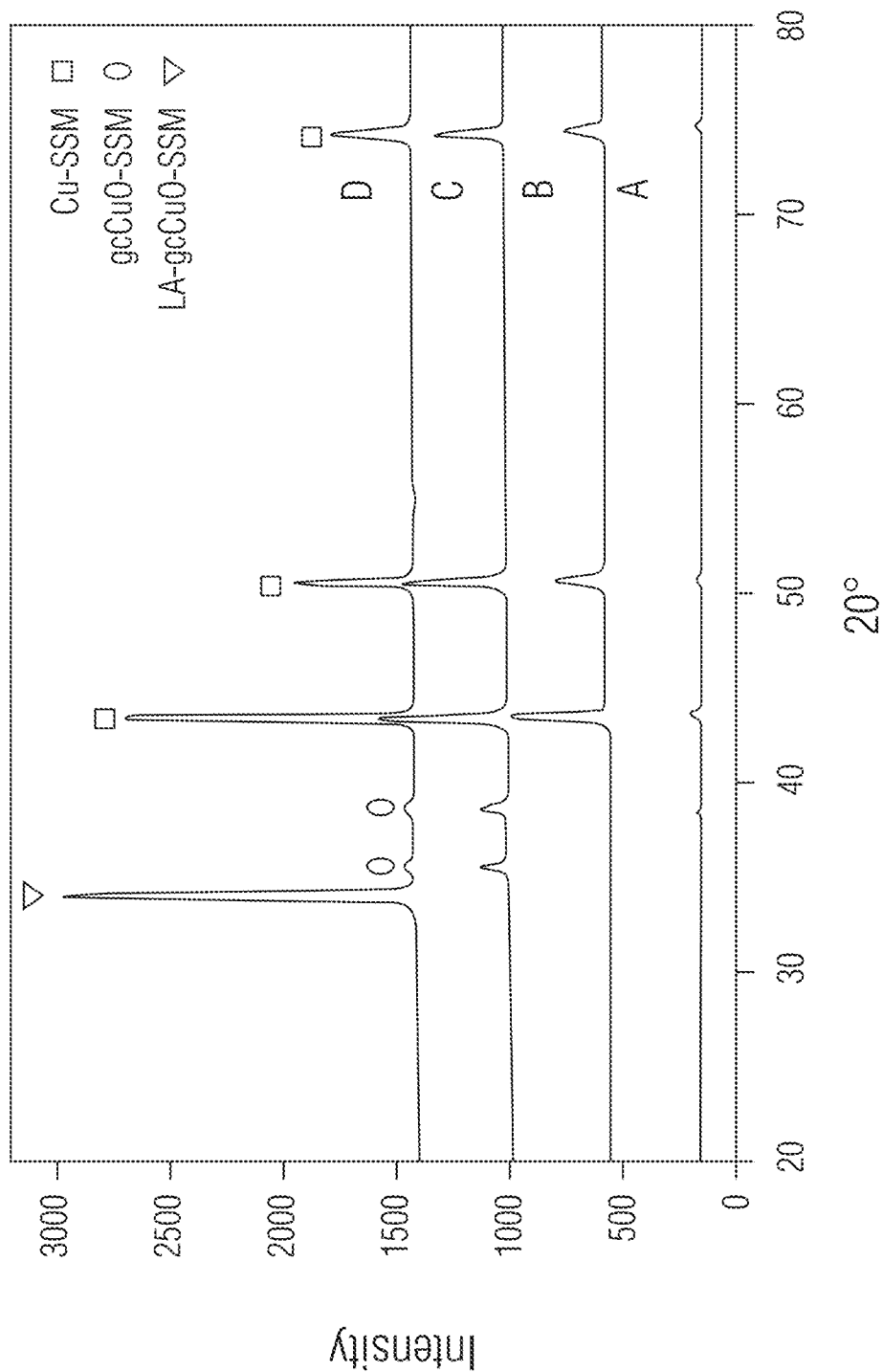
Figure 10B:
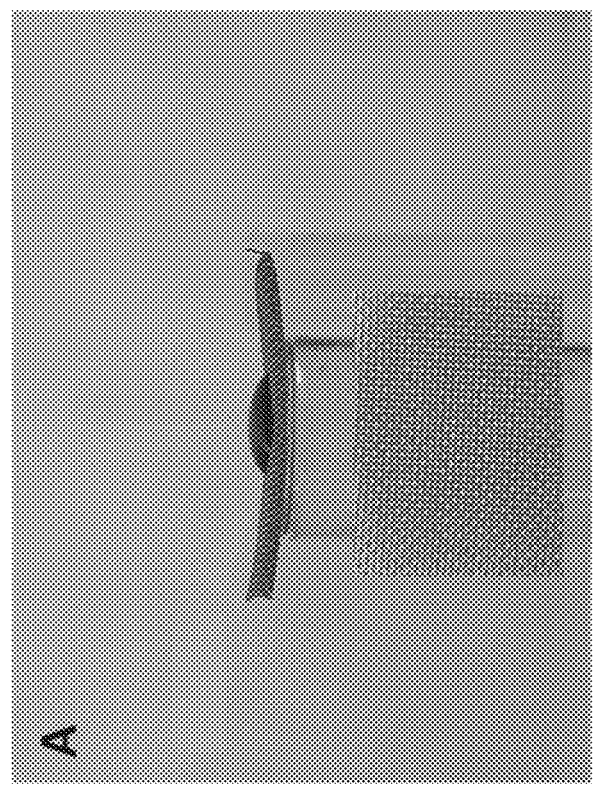
Figure 12:
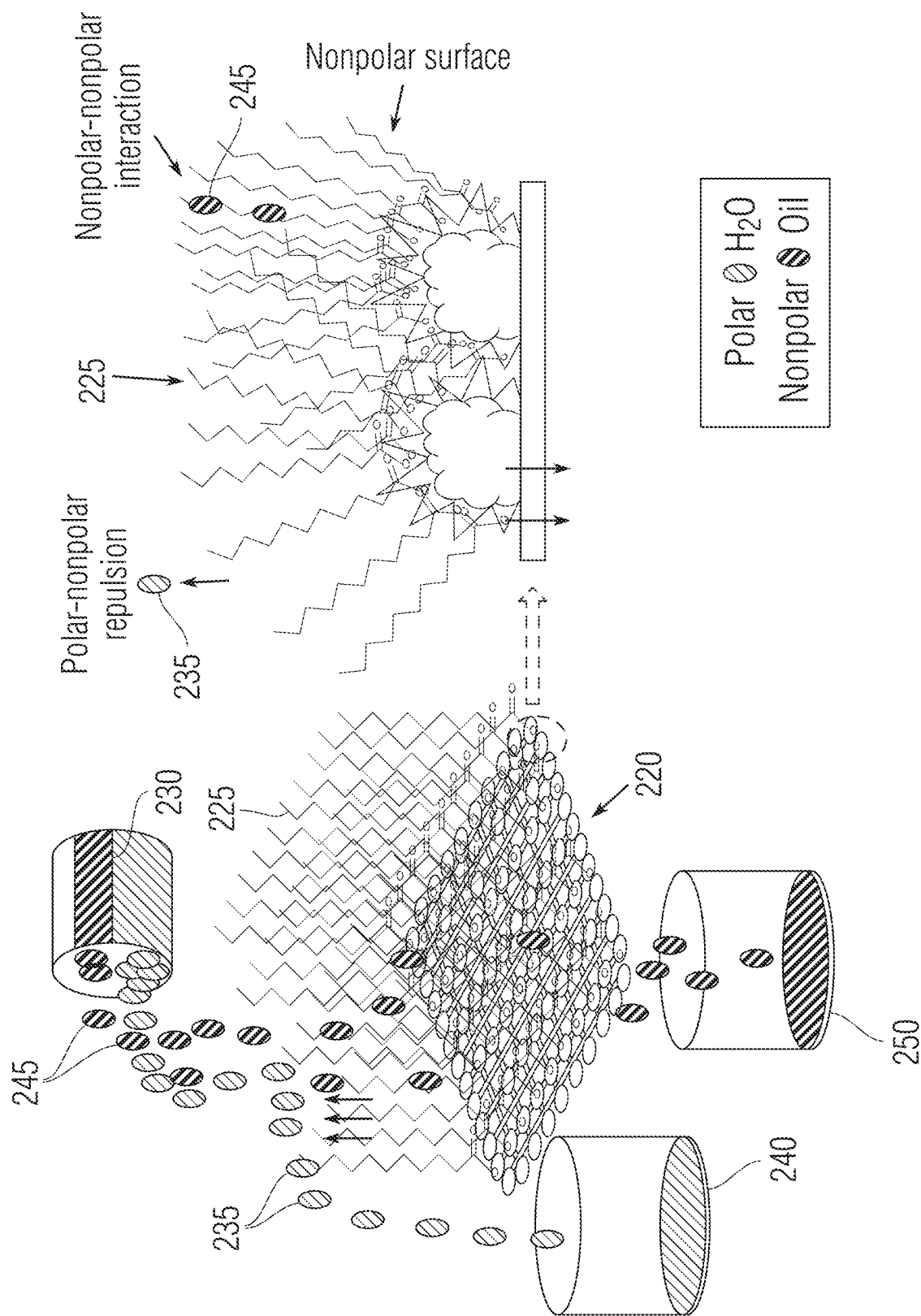

FIG. 4 shows various surfaces of various unmodified and modified stainless-steel meshes, including unmodified stainless-steel mesh (FIG. 4, top left panel), copper electroplated stainless-steel mesh (FIG. 4, top right panel), electrochemically oxidized stainless-steel mesh (gcCuO-SSM) (FIG. 4, bottom left panel), and lauric acid branched gcCuO-SSM (FIG. 4, bottom right panel) in accordance with one or more embodiments;

FIGS. 5A-5B display scanning electron microscope (SEM) images of various modified stainless-steel meshes in accordance with one or more embodiments;

FIGS. 6A-6D show Fourier-transform infrared spectroscopy (FTIR) graphs evaluating the surfaces of various unmodified and modified stainless-steel meshes in accordance with one or more embodiments;

FIGS. 7A-7D show Raman spectroscopy graphs evaluating the surfaces of various unmodified and modified stainless-steel meshes in accordance with one or more embodiments;

FIGS. 8A-8B show X-ray photoelectron spectroscopy (XPS) graphs evaluating various modified stainless-steel meshes in accordance with one or more embodiments;

FIG. 9 shows X-ray diffraction (XRD) spectra graphs evaluating various unmodified and modified stainless-steel meshes in accordance with one or more embodiments;

FIGS. 10A-10F show the behavior of various stainless-steel mesh surfaces, including an unmodified stainless-steel mesh (FIG. 10A), copper electroplated stainless-steel mesh (FIG. 10B), electrochemically oxidized stainless-steel mesh (gcCuO-SSM) (FIG. 10C), lauric acid (LA) branched gcCuO-SSM (LA-gcCuO-SSM) (FIGS. 10D-10F) in accordance with one or more embodiments. FIG. 10E shows the second side hydrophobicity of the LA-branched gcCuO-SSM, and FIG. 10F shows an upper view of the LA-branched gcCuO-SSM in accordance with one or more embodiments;

FIGS. 11A-11D show images of various unmodified and modified stainless-steel meshes and their respective water contact angles, including unmodified stainless-steel mesh (FIG. 11A), copper electroplated stainless-steel mesh (ECu-SSM) (FIG. 11B), electrochemically oxidized stainless-steel mesh (gcCuO-SSM) (FIG. 11C), and lauric acid (LA) branched gcCuO-SSM (LA-gcCuO-SSM) (FIG. 11D) in accordance with one or more embodiments; and FIG. 12 shows a diagram of a separation mechanism of oil and water using the lauric acid branched gcCuO-SSM in accordance with one or more embodiments.

DETAILED DESCRIPTION OF CERTAIN EMBODIMENTS IN ACCORDANCE WITH THE DISCLOSURE

By way of overview and introduction, the present application discloses a hydrophobic copper-coated, stainless-steel mesh (SSM) and a method for making or synthesizing the mesh. In one or more embodiments, the hydrophobic mesh of the present disclosure only allows oil to pass through it while water is rejected. Additionally, the hydrophobic mesh of the present disclosure can have excellent thermal and chemical stability, along with defined morphology.

More specifically, the present disclosure describes the synthesis, characterization and evaluation of a hydrophobic mesh material for oil/water separation. The hydrophobic mesh is a copper-coated, stainless-steel mesh functionalized with lauric acid. In other words, the presently disclosed hydrophobic mesh can be synthesized by introducing hydrophobic branches of laurate ($C_{12}H_{23}O_2^-$) on a grassy cabbage-like 3D structure of copper oxide on a stainless-steel mesh (SSM), which can be obtained by a controlled oxidation of the copper-coated stainless-steel mesh. The mesh can then be functionalized with branches of lauric acid to form a mesh that is superhydrophobic.

In one or more embodiments, the hydrophobic mesh can comprise a super hydrophobic surface. For example, the hydrophobic mesh can have a water contact angle of approximately 160°, and in certain embodiments 166.1°, which indicates super hydrophobicity of the surface. Moreover, the hydrophobic mesh of the present disclosure has a reduced cost, a more controlled morphology and a greater separation efficiency for the separation of non-polar components from water (for example, in excess of 99% based on mass) as compared with known mesh constructions.

As such, the present application addresses challenges related to removing oil contaminants from water through a novel mesh construction having hydrophobic structures presented throughout the mesh.

These and other aspects of the present stainless-steel, copper-coated hydrophobic mesh are described in further detail with reference to the accompany drawing figures, in which one or more illustrated embodiments and arrangements of the hydrophobic mesh and the synthesis methods are shown. The hydrophobic mesh and methods of the present application are not limited in any way to the illustrated embodiments and arrangements. It should be understood that the hydrophobic mesh and methods as shown in the accompanying figures are merely exemplary of the mesh and methods of the present application, which can be embodied in various forms as appreciated by one skilled in the art. Therefore, it is to be understood that any structural and functional details disclosed herein are not to be interpreted as limiting the hydrophobic mesh and methods, but rather are provided as a representative embodiment or arrangement for teaching one skilled in the art one or more ways to implement the present hydrophobic mesh and methods.

It should be understood that, as used in the present application, the term "approximately" when used in conjunction with a number refers to any number within 5% of the referenced number, including the referenced number.

Figure 1:
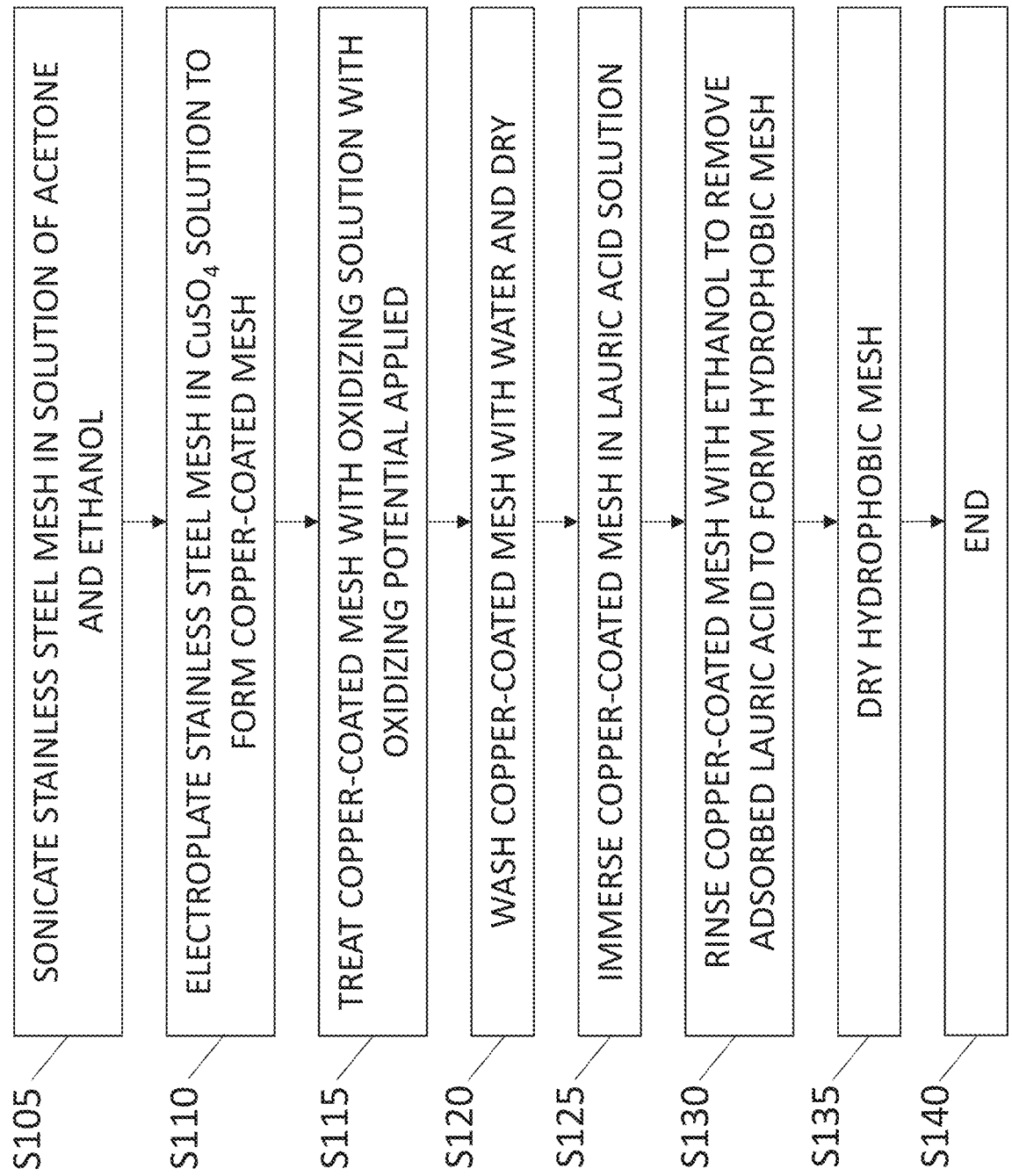

FIG. 1 displays a flow diagram illustrating a broad aspect of a method for synthesizing the hydrophobic mesh in accordance with one or more embodiments. The method begins at step S105 where a stainless-steel mesh is cleaned via sonication in a solution of acetone and ethanol. In one or more embodiments, the sonication solution is equal parts acetone and ethanol. In one or more embodiments, the stainless-steel mesh is sonicated in the solution of acetone and ethanol for approximately 10 minutes. In at least one embodiment, the mesh can be sonicated for a longer period than 10 minutes, such as 15-30 minutes, for example. The stainless-steel mesh can be of various dimensions and thicknesses depending on the required size of the of the final hydrophobic mesh.

Figure 2:
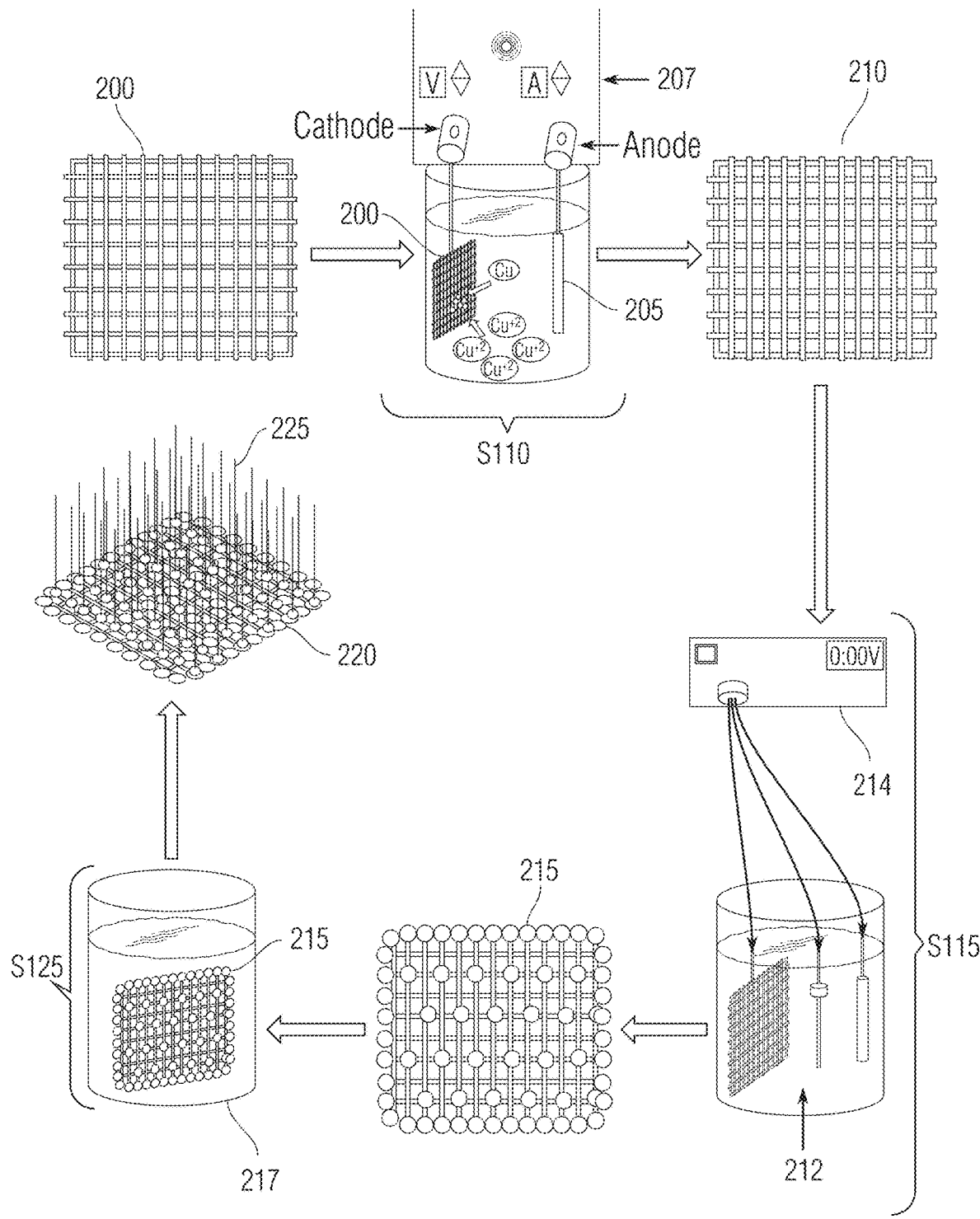
FIG. 2 shows a high-level diagram of various aspects of the present method for synthesizing the superhydrophobic mesh in accordance with one or more embodiments.

At step S110, after the stainless-steel mesh has been cleaned (sonicated), the stainless-steel mesh is electroplated in a solution comprising copper (copper solution) to form a copper-coated stainless-steel mesh. In one or more embodiments, the copper solution comprises $CuSO_4$ (for example, copper(II) sulfate pentahydrate). In one or more embodiments, the $CuSO_4$ solution is a 0.2M $CuSO_4$ solution. In one or more embodiments, the copper solution comprises at least one of $CuCl_2$, $Cu(NO_3)_2$, $CuCO_3$. FIG. 2 shows a high-level diagram of various aspects of the present method in accordance with one or more embodiments. As exemplified in FIG. 2, at step S110 the stainless-steel mesh 200 undergoes an electroplating process using an electrolysis unit. For instance, in one or more embodiments as shown in FIG. 2, the stainless-steel mesh 200 is used as cathode while a platinum (Pt) piece 205 is used as the anode for the electrolysis unit 207. A potential is applied via the electrolysis unit to the solution which causes copper in a $CuSO_4$ solution to attach to the surface of the stainless-steel mesh resulting in a copper-coated stainless-steel mesh 210. In one or more embodiments, the potential applied via the electrolysis unit is 3V. In one or more embodiments, the potential applied via the electrolysis unit is in the range of approximately 2.5V to approximately 3.5V. In one or more embodiments, the potential is applied to the solution for approximately one hour to achieve uniform copper coating on the stainless-steel mesh. Approximately one hour was determined to be an effective length of time for applying the potential to the mesh to achieve a uniform copper coating on the stainless-steel mesh. Less time resulted in the formation of a thinner layer of coating and more time resulted in a multilayer coating, both of which are not as stable as the uniform coating achieved after approximately one hour of applying the potential via the electrolysis unit. In at least one embodiment, after the electroplating step the surface of the mesh is thoroughly washed with water (for example, deionized water) to remove non-reduced $Cu^{+2}$ ions from the surface.

With reference to FIGS. 1 and 2, at step S115, the copper-coated stainless-steel mesh 210 (abbreviated herein as ECu-SSM) is treated with an oxidizing solution while an oxidizing potential is applied to the oxidizing solution. More specifically, in one or more embodiments, as exemplified in FIG. 2, the copper-coated stainless-steel mesh is immersed in an oxidizing solution 212 and an oxidizing potential is applied to the solution via a potentiostat 214, for example. In one or more embodiments, the oxidizing solution comprises $K_2SO_4$ and KOH. In at least one embodiment, the oxidizing solution is a solution of 0.03M $K_2SO_4$ and 1M KOH. In at least one embodiment, the oxidizing solution can comprise one or more of the following elements, compounds, or compositions: oxygen, ozone, hydrogen peroxide and other inorganic peroxides, Fenton's reagent, fluorine, chlorine, and other halogens, nitric acid and nitrate compounds, sulfuric acid, $MnO_4^-$ (permanganate), $CrO_4^{2-}$ (chromate), $OsO_4$ (osmium tetroxide), and $ClO_4^-$ (perchlorate). Additionally, in one or more embodiments, the oxidizing potential applied to the solution is approximately 2V and the oxidizing solution is maintained at approximately 60° C. during treatment of the copper-coated stainless-steel mesh 210. Treatment of the copper-coated stainless-steel mesh 210 with the oxidizing solution and the oxidizing potential generates a "grassy cabbage" ("gc")-like architecture 215 comprising copper (II) oxide (CuO) on the surface of the mesh (as abbreviated herein as gcCuO-SSM). The grassy cabbage architecture can include a plurality of functionalized copper oxide growths on the surface of the mesh, where each of the copper oxide growths have a diameter of approximately 5 μm in one or more embodiments. In at least one embodiment, the diameter of the copper oxide growths can be in the range of approximately 3 μm to approximately 40 μm. In one or more embodiments, the grassy cabbage architecture is visible under a scanning electron microscope (SEM).

With continued reference to FIG. 1 and FIG. 2, at step S120, the mesh having a copper coating and a grassy cabbage-like architecture 215 is washed with water and then dried. In one or more embodiments, the mesh can be dried in an oven, at approximately 60° C. for example.

After drying, at step S125, the mesh is immersed in a lauric acid solution 217. For example, the mesh can be immersed in the lauric acid solution for approximately 5 minutes. In one or more embodiments, the lauric acid solution is a 0.1M lauric acid solution in ethanol. Immersion of the mesh in the lauric acid solution results in a mesh 220 that is functionalized with lauric acid (abbreviated herein as LA-gcCuO-SSM).

After immersion in the lauric acid solution, at step S130 the LA-gccCuO-SSM mesh is thoroughly washed with ethanol to remove the adsorb lauric acid on the surface of the mesh. In other words, the ethanol removes the lauric acid that does not chemically interact with the mesh, while the lauric acid that chemically links with the mesh remained linked to the mesh. The washing of the LA-gccCuO-SSM mesh improves the hydrophobicity of the mesh relative to its hydrophobicity before the ethanol wash, as discussed in the subsequent examples section. After the ethanol wash, at step S135, the mesh is dried. In one or more embodiments, the mesh can be dried in an oven, at approximately 50° C. for example.

After drying, at step S140 the process ends. The final LA-gccCuO-SSM mesh 220 displays hydrophobic branches 225 extending from the surface of the mesh 220. The hydrophobic branches 225 of the LA-gccCuO-SSM mesh 220 comprises lauric acid.

The hydrophobic mesh formed as a result of the method discussed previously is a "superhydrophobic" mesh (exhibits a water contact angle of greater than 150°). In particular, in one or more embodiments, the superhydrophobic mesh of the present application displays a water contact angle of approximately 160°, and in at least one embodiment, 166.1°. The superhydrophobic mesh of the present application also displays improved separation efficiency. For instance, in one or more embodiments, the superhydrophobic mesh displays a separation efficiency for the separation of non-polar components from water of greater than 99%, as discussed in the subsequent examples section. It should be noted that as used in the present application, separation efficiency percentage is based on mass. The high-water contact angle and separation efficiency displayed by the superhydrophobic mesh of the present application makes the mesh particularly effective for oil/water separation applications.

Additional features and attributes of the superhydrophobic mesh of the present application are shown in the following examples in accordance with one or more embodiments.

EXAMPLES

Separation Efficiency

Figure 3:
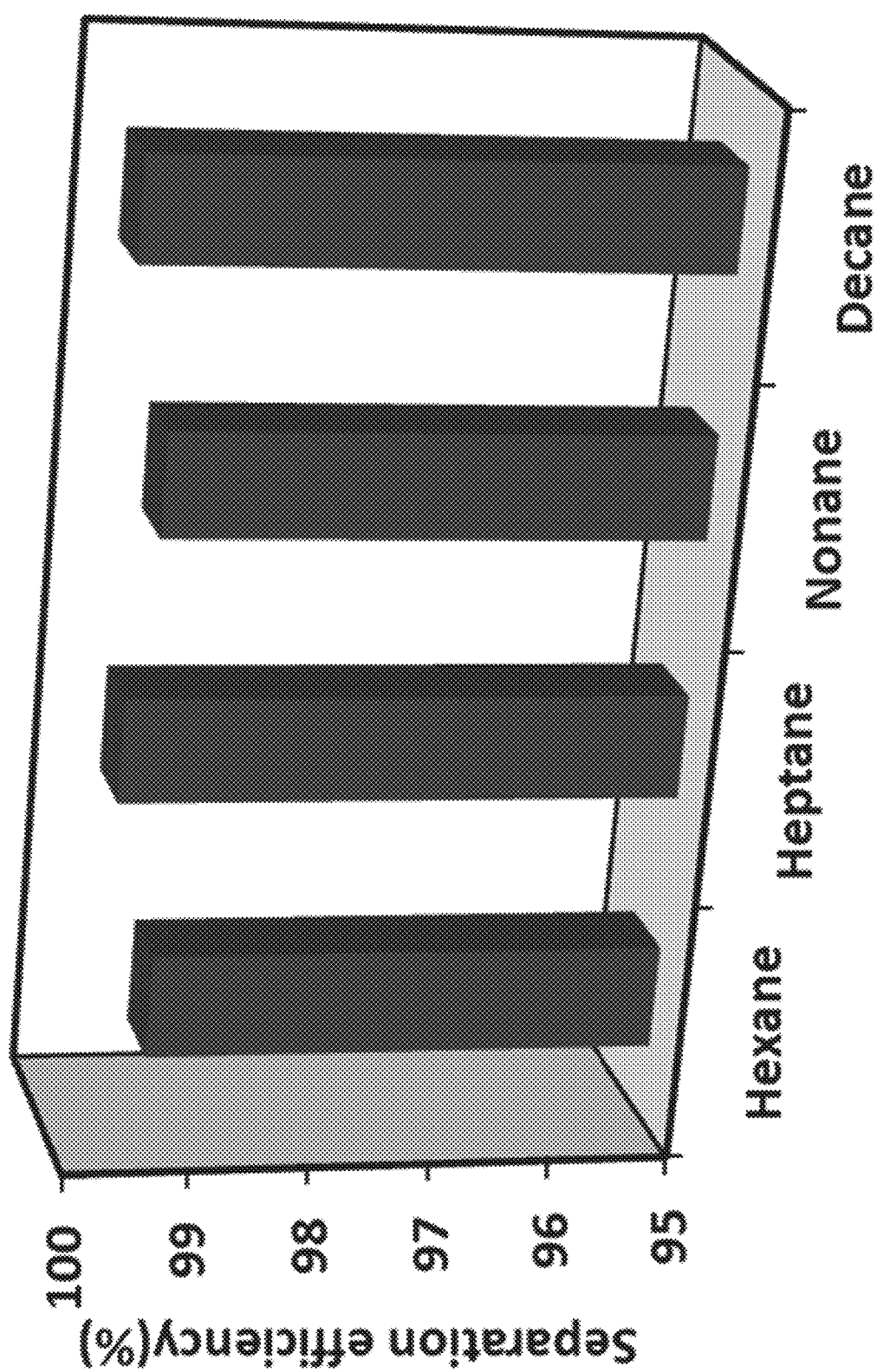
FIG. 3 shows the separation efficiency of the superhydrophobic mesh in separating non-polar solvents hexane, heptane, nonane, and decane from water in accordance with one or more embodiments.

The performance of the superhydrophobic mesh (LA-gccCuO-SSM) material was evaluated for its separation efficiency of non-polar component separation from water. Specifically, each of several non-polar solvents including hexane, heptane, nonane, and decane were separated from water using the superhydrophobic mesh (LA-gccCuO-SSM). The separation efficiency was determined by applying synthetic mixtures of the respective non-polar compounds and water through the superhydrophobic mesh under the force of gravity. For each of the non-polar solvents hexane, heptane, nonane, and decane, the superhydrophobic mesh material displayed a separation efficiency in excess of 99% as shown in the bar graph of FIG. 3.

Morphology Characterization

The surface morphologies of various untreated and modified stainless-steel mesh (SSM) were investigated with a scanning electron microscope. The surface morphology was investigated at both a low magnification (100, 10 μm) and at a high magnification (5, 1 μm).

The low magnification SEM images revealed that unmodified SSM 200 has a plane surface (FIG. 4, top left panel). After copper electroplating on the SSM surface (210), the SSM woven wires became thicker, which was an indication of successful coating of copper. The growth of the Cu on the SSM was planar (FIG. 4, top right panel). The color of the SSM changed to reddish orange, which is a typical color for copper.

The electrochemically oxidized Cu-SSM 215 (FIG. 4, bottom left panel) showed some roughness on the SSM surface. Further magnification displayed that the porous surface arose from the embedded particles of the CuO. The planar surface of the electroplated copper turned into a porous surface full of particles (FIG. 4, bottom left panel). A similar surface appearance was observed after modifying the CuO-SSM with lauric acid 220 (FIG. 4, bottom right panel).

The SSM modified meshes were also evaluated at high magnification using a scanning electron microscope (SEM) to understand the actual morphology of the electrochemically generated CuO on the surface of the mesh (FIGS. 5A-5B). The SEM images in FIG. 5A-5B show 5 μm magnification (FIG. 5A) and 1 μm magnification (FIG. 5B) images of the electroplated Cu SSM (ECu-SSM) mesh (top panels), the grassy cabbage CuO-SSM (gcCuO-SSM) mesh (middle panels), and the lauric acid branched grassy cabbage CuO-SSM (LA-gcCuO-SSM) mesh (bottom panels). The high magnification images revealed that the electroplated copper was homogenously spread in the form of planar smooth particles instead of a continuous planar sheet of copper. However, the growth of the Cu on the SSM is more towards a two-dimensional (2D) surface rather than a three-dimensional (3D) one (see FIG. 5A, top panel and FIG. 5B, top panel). The high magnification image of the electrochemically oxidized electroplated Cu-SSM (gcCuO-SSM) revealed a remarkably different morphology of the CuO on the SSM. The planar 2D surface of the Cu upon electrochemical oxidation in the strong oxidizing medium was transformed into a 3D morphology (FIGS. 5A and 5B, middle panels). A high-resolution image revealed that during the electro-oxidation process the CuO self-assembled in a form in which the base looks like a cabbage flower and moves upward with a wavy, grassy sharp spread of CuO uniformly in all directions (FIGS. 5A and 5B, middle panels). The grassy-cabbage morphology of the CuO was retained in the LA-gcCuO-SSM (FIGS. 5A and 5B, bottom panels).

An important aspect was observed during the synthesis process. Specifically, the obtained morphology in the mesh was totally different from previously reported morphologies obtained with copper. The CuO triangular-shaped petals, with a size of 10-15 µm, were obtained through 18 hours of hydrothermal reaction. The high potential of 20 V was used to achieve the flower-like CuO nanorods.

For the hydrophobic mesh of the present application, in accordance with one or more embodiments, a different and unique morphology of the CuO was obtained on the stainless-steel by using a modified methodology in which a controlled low potential and a constant temperature of 60° C. were applied. The obtained morphology has a base like a cabbage flower on which many wavy grass-like growths were observed. These grassy-like growths resulted an increased surface area of the copper oxide and thus, provides more space for interactions and functionalization compared to the previously reported compact flower growth. The diameter of the grassy cabbage-like the flower was observed to be in the range of approximately 5 µm.

Structural Characterization

Figure 6A:
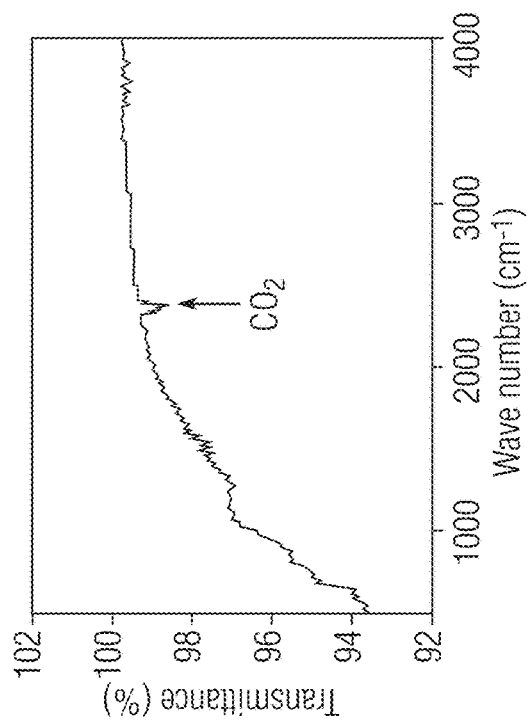
Figure 6C:
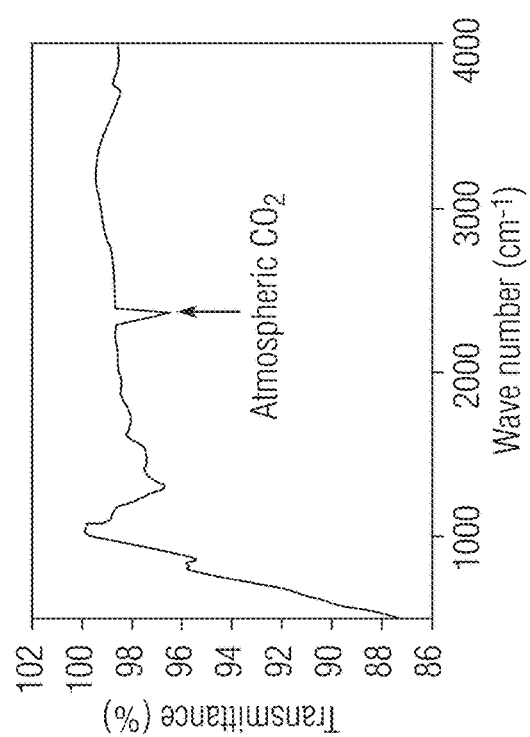
Figure 6B:
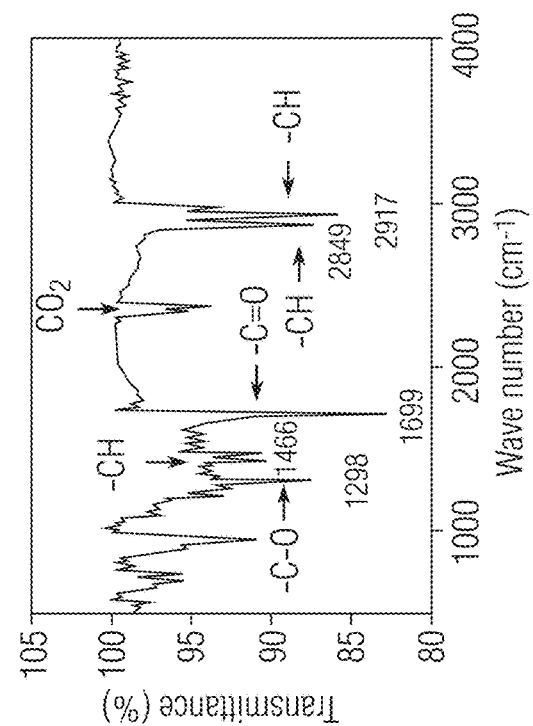

The different surfaces of various untreated and modified stainless-steel meshes were investigated by using Fourier-transform infrared (FTIR) spectroscopy as shown in FIGS. 6A-6D. The SSM (FIG. 6A) and ECu-SSM (FIG. 6B) produced via electroplating (ECu-SSM) did not show any characteristic peaks except for the two absorption peaks that appeared at 2342 and 2360 reciprocal centimeters ($cm^{-1}$) (FIGS. 6A and 6B, respectively). These peaks appeared due to the atmospheric $CO_2$ which was present due to the porous network of the mesh. The $CO_2$ peak appeared in all the FTIR spectra of the meshes due to continuous pores of the mesh and the presence of air. The FTIR spectra of the grassy cabbage copper oxide stainless-steel mesh (gcCuO-SSM) displayed similar spectra to SSM and ECu-SSM, however, it had one additional peak that appeared at 668 $cm^{-1}$ (FIG. 6C). This may have appeared due to the oxidation of copper.

Figure 6D:
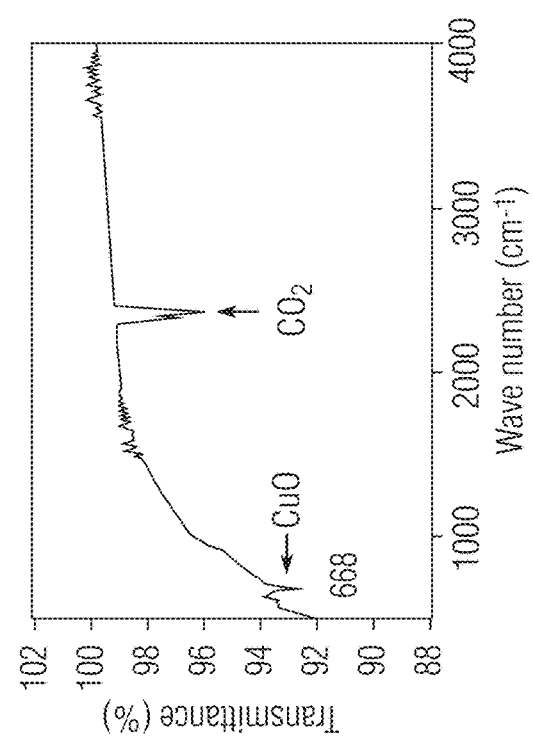

The FTIR spectra of the superhydrophobic mesh of the present application in accordance with one or more embodiments (LA-gcCuO-SSM) provided evidence of the interaction of the lauric acid with the gcCuO-SSM (see FIG. 6D). As aforementioned, the FTIR spectra of the various treated and unmodified meshes did not show any presence of organic functionalities on the surface. The LA-gcCuO-SSM FTIR revealed functionality peaks due to the interaction of the gcCuO-SSM with the lauric acid. The —C═O peak appeared at 1699 $cm^{-1}$, while the peaks which appeared at 2849 and 2917 $cm^{-1}$ were due to the —C—H symmetric and asymmetric stretching vibrations. The peak that appeared at 1298 was assigned to —C—O vibrations. However, the —OH stretching vibration peak of the lauric acid that generally appeared at around 3400 $cm^{-1}$ was absent in the spectra of the LA-gcCuO-SSM. This may be due to the replacement of hydrogen by the copper ions to make a $Cu[CH_3—(CH_2)_{10}—CO_2]$ complex on the SSM. The FTIR spectra of the LA-gcCuO-SSM confirmed that the lauric acid interacted with the gcCuO-SSM surface successfully (FIG. 6D).

The oxidation of the copper and its functionalization with the organic component was further investigated with Raman spectroscopy. The SSM and the copper electroplated SSM (ECu-SSM) did not show any significance Raman peaks. After oxidation, the gcCuO-SSM did show some distinct Raman peaks that appeared at 297, 347, 630 and 1121 $cm^{-1}$. The peaks that appeared at 297 and 347 $cm^{-1}$ can be assigned to the $A_g$ and the $B_g$ Raman active modes of the CuO. The appearance of the peaks at 297, 347 and 630 $cm^{-1}$ clearly indicates the formation of the CuO during the electrochemical oxidation process of the electroplated Cu-SSM.

Figure 7A:
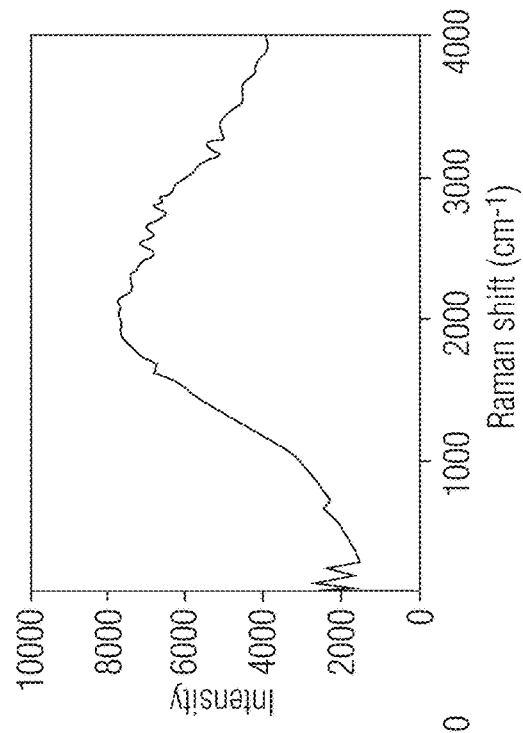
Figure 7B:
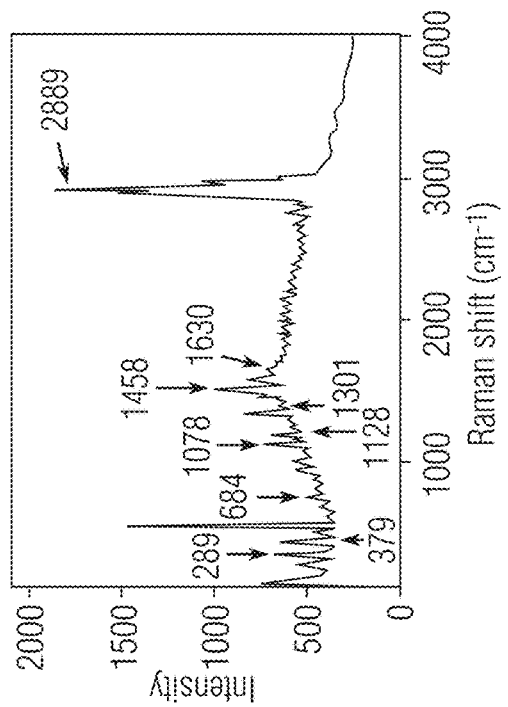
Figure 7C:
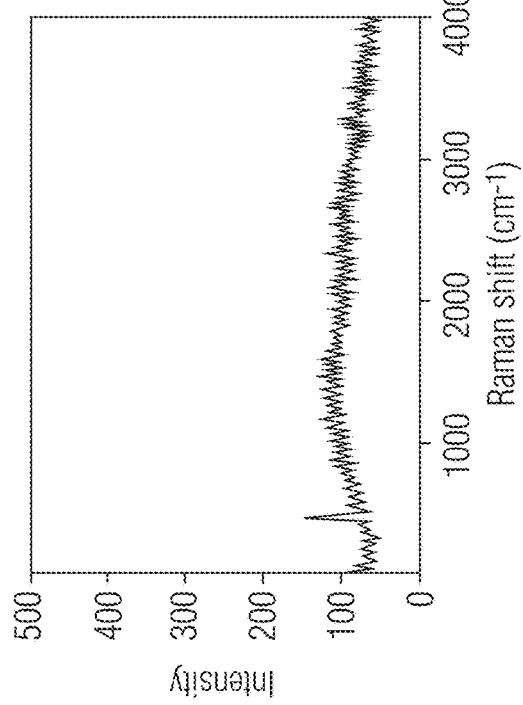
Figure 7D:
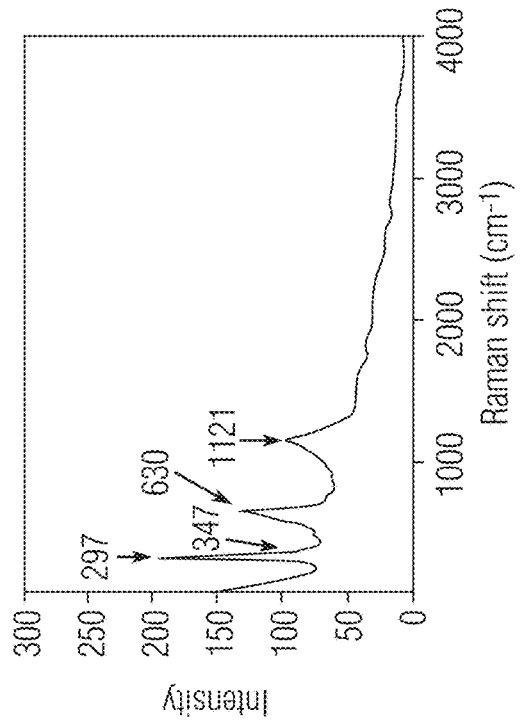

The Raman spectra of the LA-gcCuO-SSM (FIG. 7D), however, was entirely different compared to the SSM (FIG. 7A), ECu-SSM (FIG. 7B) and the gcCuO-SSM (FIG. 7C), which revealed that some rigorous changes have taken place on the surface of the SSM after interaction with the lauric acid. The —$CH_2$ twisting Raman peak appeared at 1301 $cm^{-1}$ (FIG. 7D). The peaks that appeared at the 1078 and 1128 $cm^{-1}$ might be due to the stretching band of the —C—C— of the lauric acid (FIG. 7D). The sharp band that appeared at 1458 $cm^{-1}$ was due to the —$CH_2$— wagging and scissoring movement (FIG. 7D). The moderate and somewhat broad Raman that peak appeared at 1630 $cm^{-1}$ was assigned to the —C═O carbonyl functional group of the lauric acid (FIG. 7D). These functionalities present on the surface of the LA-gcCuO-SSM confirmed the successful interaction of the lauric acid with the CuO, which was formed by making an ester linkage.

The synthesized meshes were also studied by conducting an X-ray photoelectron spectroscopy (XPS) analysis as shown at FIGS. 8A-8B. During the XPS analysis, the C1s, Cu 2p, and the O 1s signal were observed. FIG. 8A shows the results of the XPS analysis for ECu-SSM and FIG. 8B shows the results of the XPS analysis for LA-gcCuO-SSM. For both FIGS. 8A and 8B, the spectra of the C1s signal is shown in the top panel, the spectra of the Cu 2p signal is shown in the middle panel, and the spectra of the O 1s signal is shown in the bottom panel.

The copper electroplated SSM (ECu-SSM) displayed unexpected C and the O peaks at binding energies of 284.8 and 531.8 electron-volts (eV), respectively (FIG. 8A, top and bottom panels, respectively). The carbon peaks normally appeared due to the added impurities from the surroundings. Similarly, surface adsorbed oxygen also appeared in the XPS spectra. The XPS scanning of the ECu-SSM showed two distinct peaks of Cu $2p_{3/2}$, and Cu $2p_{1/2}$ at binding energies of 932.9 and 952.81 eV, respectively (FIG. 8A, middle panel). The appearance of the Cu $2p_{3/2}$ and Cu $2p_{1/2}$ peaks revealed the successful electrochemical coating of the copper on the SSM. Oxidation of the ECu-SSM demonstrated some obvious changes in the binding energy of the Cu 2p. The fitting of the Cu $2p_{3/2}$ revealed two peaks, one weak peak at 932.6 eV (Cu $2p_{3/2}$ A) and another sharp intense peak at a binding energy of 933.6 eV. The appearance of a weak peak at 932.6 eV corresponds to a small presence of Cu (I) and the shape of the peak at 933.6 eV with greater intensity corresponds to Cu (II). The Cu $2p_{1/2}$ peak appeared at a binding energy of 953.44 eV. Characteristic satellite peaks were also observed in the oxidized spectra of copper which is also a characteristic of copper oxide (FIG. 8A, middle panel). The oxygen peaks of the CuO appeared at 529.43 eV and the adsorbed oxygen peak was assigned to 531 eV (FIG. 8A, bottom panel). The XPS spectra of the ECuO-SSM revealed the successful formation of the CuO with a very small concentration of $Cu_2O$ on the surface of the SSM. No peak was observed at 935 eV which indicates that $Cu(OH)_2$ was not formed during the oxidation of the ECu-SSM.

The XPS spectra of the La-gcCuO-SSM (FIG. 8B) also displayed the C1s, Cu 2p and O 1s, however, greater distortion in the spectra was observed, which is an indication that some changes on the surface took place during its interaction with lauric acid. In the LA-gcCuO-SSM, the O 1s adsorption peak appeared at almost the same binding energy as that of 531 eV, however, the CuO oxygen peak was shifted to a higher binding energy of 531.9 eV (FIG. 8B, bottom panel). The shift in the oxygen binding energy is an indication of the interaction of the carboxylic group of the acid with the gcCuO-SSM. Similarly, the Cu $2P_{3/2}$ spectra displayed two peaks after fitting. One peak appeared at a binding energy of 932.6 eV, while another one appeared at 934.6 eV which clearly shows a sharp shift in the peak (FIG. 8B, middle panel). This might be an indication that the Cu(II) strongly interacted with the LA to make a metallic ester linkage. Another indication of the interaction is the shift in the binding energy of the Cu $2p_{1/2}$, from 952.81 (ECu-SSM), 953.4 eV (gcCuO-SSM) to 954.4 eV (LA-gcCuO-SSM) (FIG. 8B, middle panel). The XPS detailed study provides useful information regarding the changes taking place during each step, from the electroplating to the oxidation, and finally the formation of the possible linkage of the fatty acid with the gcCuO-SSM.

The XRD spectra of the various untreated and modified stainless-steel meshes are shown at FIG. 9, where "A" represents the XRD spectra for SSM, "B" represents the XRD spectra for ECu-SSM, "C" represents the XRD spectra for gcCuO-SSM, and "D" represents the XRD spectra form LA-gcCuO-SSM. With reference to FIG. 9, the Cu electroplated XRD peaks appeared at 43.3°, 50.5°, 74.2° and the CuO peaks were observed at 35.4°, and 38.4°. In the LA-gcCuO-SSM XRD spectra, a decrease in the intensity of CuO peaks was observed and a new XRD peak appeared at 33.8°. The appearance of a new peak, along with a decrease in the intensity of the CuO peaks and an increase in the intensity of the Cu peaks provides evidence that the lauric acid successfully interacted with the grassy cabbage-like architecture of the CuO.

Generation of Cu and Grassy Cabbage-Like CuO Layer on the Stainless-Steel Mesh

A piece of stainless-steel mesh was dipped into a 1 M $CuSO_4$ solution. A copper wire was then passed through the piece stainless-steel mesh to develop an electrical connection. After that, a controlled potential electrolysis was performed. The stainless-steel mesh was attached to the cathode while the platinum wire was attached to the anode of the electrolysis unit. In order to determine an optimum potential of forming a perfect and uniform coating, various potentials in the range of 0-10 V were examined. Initially, a low potential of 1 volt was applied and it was found that the coating was poor and only a few depositions of copper were found on the surface of the SSM. Then, when the potential was increased to 3V, a uniform and strong coating was observed on the surface of the SSM. Moreover, the surface gained a reddish-brown color, which is an indication of the successful coating of copper on the SSM surface. The effect of this potential was further explored by applying higher potentials of 5 and 10 V. Using a high potential has shown that copper poorly adhered onto the mesh surface. Therefore, 3V was found to be an effective potential for obtaining the ECu-SSM. Thereafter, the time required to have a strong and perfectly coated surface at 3V was investigated. One hour was found to be a particularly effective time obtaining a coating of copper on the SSM. After the electroplating step, the surface was thoroughly washed with deionized water to remove the non-reduced $Cu^{+2}$ ions from the surface of the electroplated stainless-steel. The mesh was then stored at room temperature for further use.

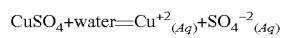

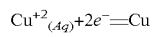

The thin layer of copper-coated stainless-steel (ECu-SSM) was further chemically and electrochemically treated to transfer a 2D layer of Cu into the 3D CuO. This was achieved under strongly oxidizing conditions with the assistance of the applied potential. In the strong oxidizing environment, the applied potential triggered the electro-oxidation of the copper where the electroplated layer of copper atoms oxidized into $Cu^{+2}$. Ultimately, a cupric oxide layer was formed on both sides of the SSM. During the controlled process, a new morphology of the CuO was clearly observed from the SEM images. The copper oxide appeared like a grassy grown cabbage architecture. The grassy cabbage-like architecture was found to be more effective for further interactions. The formation of the cupric oxide layer was also observed with the change of color of the SSM. After oxidation, a blackish color began to appear.

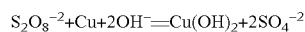

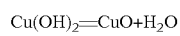

Hydrophobicity and the Oleophilicity Evaluation of the SSM

Various SSM surfaces comprised of unmodified and modified forms were evaluated for their hydrophobic and oleophilic behavior. The hydrophobicity of the various surfaces such as SSM, ECu-SSM, gcCuO-SSM and the LA branched gcCuO-SSM were evaluated through the contact angle of the water. The contact angle is an important parameter for distinguishing the hydrophobicity of various surfaces. The water contact angle measurement is a direct estimation of the surface hydrophobicity. For this reason, the various unmodified and modified mesh contact angles were measured. The surfaces were generally considered hydrophilic if the water contact angle was less than 90° and hydrophobic if the water contact angle was larger than 90°.

FIGS. 10A-10F show the behavior of various stainless-steel mesh surfaces, including an unmodified stainless-steel mesh (SSM) (FIG. 10A), copper electroplated stainless-steel mesh (FIG. 10B), electrochemically oxidized stainless-steel mesh (gcCuO-SSM) (FIG. 10C), lauric acid (LA) branched gcCuO-SSM (LA-gcCuO-SSM) (FIGS. 10D-10F) in accordance with one or more embodiments. FIG. 10E shows the second side hydrophobicity of the LA-branched gcCuO-SSM, and FIG. 10F shows an upper view of the LA-branched gcCuO-SSM in accordance with one or more embodiments.

Figure 10A:
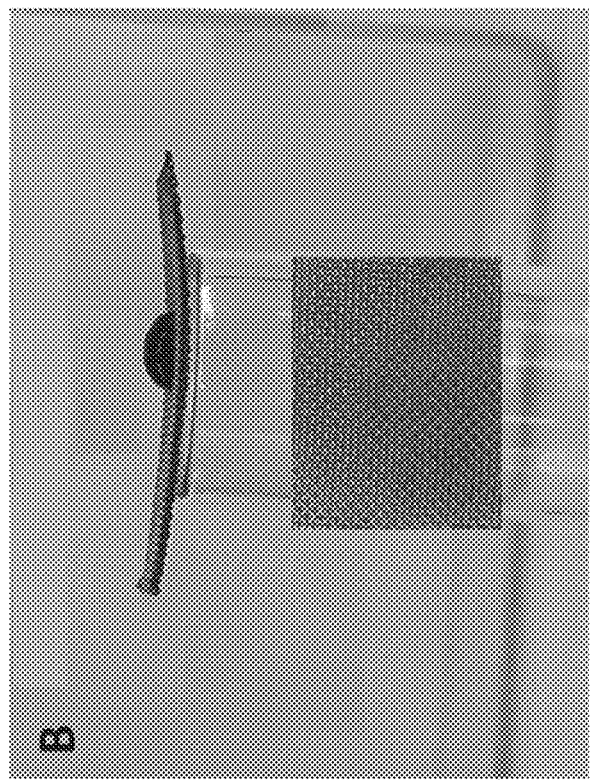
Figure 10D:
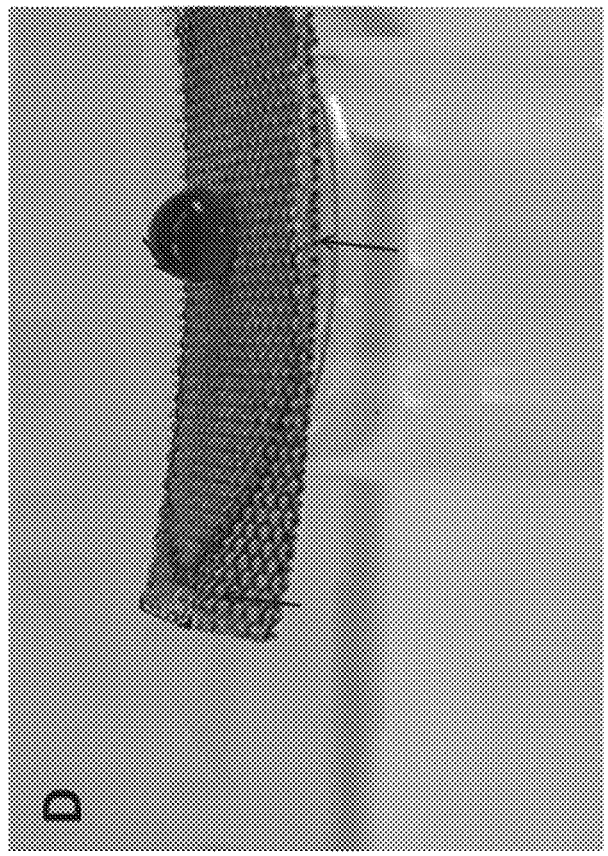
Figure 10C:
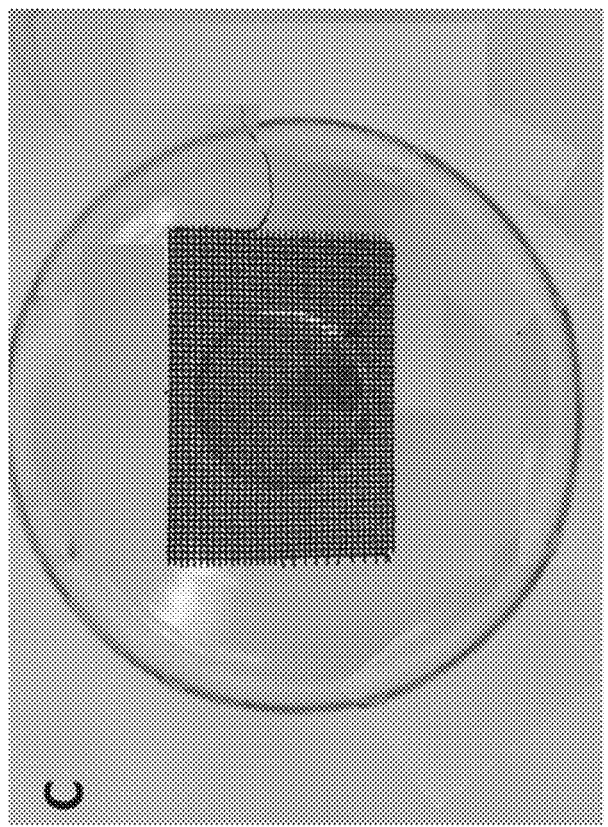

As shown in FIG. 10A, the unmodified SSM has a low contact angle for water (in the image, methylene blue colored water). Similarly, as shown in FIG. 10B, the ECu-SSM having a reddish-brown Cu layer displayed a somewhat higher contact angle for water relative to the unmodified SSM. For the gcCuO-SSM as shown in FIG. 10C (which comprises a black layer) the water contact angle is lower than that of both the SSM and ECu-SSM, as the water tends to spread along the surface of the mesh. In contrast, the LA-gcCuO-SSM as shown in FIGS. 10D-10F displays a water repellant surface, and thus has a high water contact angle relative to the other meshes. As shown in FIGS. 10D and 10E, both sides of the mesh display a high water contact angle.

FIGS. 11A-11D show additional images of the various unmodified and modified stainless-steel meshes and their respective water contact angles. The SSM demonstrated a poor hydrophobic behavior and water droplets were almost scattered on the surface with a very low contact angle. The water contact angle was found to be 97.6 (FIG. 11A). Moreover, the water strongly adhered to the surface of the SSM. This might be due to absorption of some hydroxyl groups on the surface which lead to some hydrophilic behavior of the SSM. The copper electroplated mesh showed some improved hydrophobic behavior compared to SSM and the water contact angle increased to 112.0° (FIG. 11B). However, the hydrophobicity after copper electroplating was not substantially improved. Moreover, the droplet was strongly adhered to the surface of the mesh even after tilting the surface to 90°. This behavior of the SSM and the ECu-SSM is an indication of their poor hydrophobicity.

The electro-oxidation of the ECu-SSM in a strong oxidizing medium to form the gcCuO-SSM considerably decreased the hydrophobic behavior of the Cu electroplated mesh. It can be observed from FIG. 10C that the water droplet spread over the surface of the gcCuO-SSM. The copper electroplated mesh displayed a hydrophilic character after treating at a positive potential in a strongly oxidizing environment. The oxidation process is the reason behind introducing oxygen onto the mesh surface. These functionalities change the surface behavior from less hydrophobic to more hydrophilic. This was evident from the sharp decrease in the contact angle from 112.0° to 52.7° (FIGS. 11B-11C).

The gcCuO-SSM was then further functionalized and branched with lauric acid (FIG. 11D). The grassy-like sharp extended edges at the micro level helped to achieve an extensive branched surface with lauric acid. Further, the grassy cabbage-like architecture was more attractive and exposed more CuO for interaction with the lauric acid. The various aforementioned surface characterizations also confirm the formation of cupric laurate. The long chain of copper laurate prevents the absorption of the hydroxyl group onto the surface and imparts superhydrophobic characteristics onto the mesh. The water contact angle was surprisingly improved from 52.7° to 166.1° (FIGS. 11C-11D).

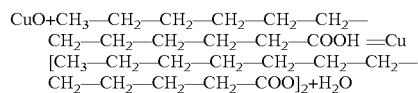

Oil/Water Separation Mechanism

An oil and water separation mechanism of the presently disclosed mesh is exemplified in FIG. 12. In the diagram of FIG. 12, oil-contaminated water 230 is poured onto the LA-gcCuO-SSM mesh 220. Because water is polar, the water 235 of the oil-contaminated water 235 is strongly rejected (polar-nonpolar repulsion) by the hydrophobic branches 225 of the laurate of the mesh 220. The grassy extension provides a circular growth of the hydrophobic branches 225 which cover the mesh 220 entirely. Water droplets are strongly repelled by the surface and it is difficult for water droplets to stay on the surface. As such the water droplets run off the side of the hydrophobic branches 225 into a water collector 240. Unlike the water 235, the oil 245 in the oil-contaminated water 230 is nonpolar and thus attracted to the hydrophobic branches 225 (nonpolar-nonpolar interaction). As such, the oil 245 runs into and eventually through the mesh 220 into an oil collector 250.

In contrast to the LA-gcCuO-SSM mesh 220 as exemplified in FIG. 12, water droplets strongly adhere to the surface of SSM and ECu-SSM meshes. The strong repulsion of water droplets by the LA-gcCuO-SSM 220 is an indication that hydrophobic branches 225 are attached all around the mesh 220. In addition, the grassy cabbage-like architecture facilitated the achievement of the superhydrophobic surface. The surface of the LA-gcCuO-SSM was found to be superoleophilic as it allowed for the fast passage of non-polar compounds (for example, hexane) through it. Non-polar compound droplets spread rapidly on the surface and passed through the LA-gcCuO-SSM 220.

Thus, in one or more embodiments, the superhydrophobic mesh of the present application only allows oil to pass through it while water is rejected. Additionally, the superhydrophobic mesh of the present application can have excellent thermal and chemical stability, along with defined morphology. Further, the present superhydrophobic mesh can help in produced water treatment for flooding and fracturing applications.

For example, the present superhydrophobic mesh can be used as a filtration medium (for example, in a filtration unit) to separate oil and water. The oil content in produced water need to be reduced to a very low concentration to avoid blogging the formation. However, conventional de-oiling technologies, such as gravity-based separators (for example, a separator vessel), skimmers, and flocculation-coagulation techniques have many disadvantages, including their complex separation mechanisms, use of expensive chemicals, energy-intensive processes, negative environmental impact, and inefficient separation methods. In contrast, the presently disclosed mesh material has a controlled morphology, high water repellency, and is superhydrophobic, which means that it only allows the organic components to pass through it while water does not. As such, the presently disclosed mesh material provides improved separation efficiency and rejections certain contaminants.

Further, new fields can sometimes require further treatment after the gravity separation and the presently disclosed mesh material can be utilized for such application. Moreover, the present mesh can be useful for recovering the oil trapped in produced water, which is conventionally re-injected back into the injection or disposal wells. Also, the present mesh material can be used to enhance the oil/water separation in a gas oil separation plant and reduce chemicals injections.

Moreover, the present superhydrophobic mesh material overcomes challenges and difficulties associated with copper-based meshes for oil-water separation. In particular, stainless-steel meshes are generally cheaper, can withstand harsh conditions, and have a more controlled morphology compared to copper meshes. Finally, it has been observed that the present superhydrophobic mesh has a higher superhydrophobicity compared to copper-based meshes.

Although much of the foregoing description has been directed to the superhydrophobic mesh and method of synthesizing the superhydrophobic mesh disclosed herein, the mesh and the method disclosed herein can be similarly deployed and implemented in scenarios, situations, and settings far beyond the referenced scenarios. For example, the hydrophobic mesh disclosed herein can be utilized for the separation of other types of liquid, solid, or semi-solid compositions, or combinations thereof. It should be further understood that any such implementation or deployment is within the scope of the system and methods described herein.

It is to be further understood that like numerals in the drawings represent like elements through the several figures, and that not all components and steps described and illustrated with reference to the figures are required for all embodiments or arrangements. Further, the terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "including," "comprising," or "having," "containing," "involving," and variations thereof herein, when used in this specification, specify the presence of stated features, integers, steps, operations, elements, or components, but do not preclude the presence or addition of one or more other features, integers, steps, operations, elements, components, or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Notably, the figures and examples discussed in the present disclosure are not meant to limit the scope of the present disclosure to a single implementation, as other implementations are possible by way of interchange of some or all of the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an implementation showing a singular component should not necessarily be limited to other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

The foregoing description of the specific implementations will so fully reveal the general nature of the disclosure that others can, by applying knowledge within the skill of the relevant art(s) (including the contents of the documents cited and incorporated by reference herein), readily modify or adapt for various applications such specific implementations, without undue experimentation, without departing from the general concept of the present disclosure. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). It is to be understood that dimensions discussed or shown are drawings are shown accordingly to one example and other dimensions can be used without departing from the disclosure.

The subject matter described previously is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A method for synthesizing a hydrophobic mesh, the method comprising:
   sonicating a stainless-steel mesh in a solution of acetone and ethanol;
   electroplating the stainless-steel mesh in a copper solution to form a copper coating on the surface of the stainless-steel mesh;
   treating the copper-coated stainless-steel mesh with an oxidizing solution, wherein an oxidizing potential is applied in the oxidizing solution, and wherein the oxidizing solution comprises 0.03M $K_2SO_4$ and 1M KOH;
   washing the copper-coated stainless-steel mesh with water and drying the copper-coated stainless-steel mesh;
   immersing the copper-coated stainless-steel mesh in a lauric acid solution;
   rinsing the copper-coated stainless-steel mesh with ethanol to remove adsorbed lauric acid; and
   drying the copper-coated stainless-steel mesh,
   wherein the hydrophobic mesh comprises hydrophobic branches of lauric acid.

2. The method of claim 1, wherein the stainless-steel mesh is sonicated for approximately 10 minutes.

3. The method of claim 1, wherein the copper solution is a $CuSO_4$ solution.

4. The method of claim 1, wherein a potential of approximately 2.5V to approximately 3.5V is applied to the copper solution during electroplating at a temperature of approximately 60° C.

5. The method of claim 4, wherein the application of potential during the electroplating step results in the formation of a plurality of functionalized copper oxide growths on the surface of the stainless-steel mesh each having a diameter of approximately 3 μm to 40 μm.

6. The method of claim 1, wherein the oxidizing potential is approximately 2V.

7. The method of claim 1, wherein the lauric acid solution comprises 0.1M lauric acid solution in ethanol.

8. The method of claim 1, wherein the step of drying the copper-coated stainless-steel mesh comprises drying the copper-coated stainless-steel mesh in an oven at approximately 50° C.

9. The method of claim 1, wherein treating the copper-coated stainless-steel mesh with the oxidizing solution results in a mesh having an architecture on its surface that comprises a plurality of copper oxide growths.

10. The method of claim 1, wherein the hydrophobic mesh displays a water contact angle of approximately 160°.

11. The method of claim 1, wherein the hydrophobic mesh has a separation efficiency of greater than 99% for the separation of non-polar components from water.

12. The method of claim 11, wherein the non-polar components comprise hexane, heptane, nonane, and decane.

13. A method for synthesizing a hydrophobic mesh, the method comprising:
- sonicating a stainless-steel mesh in a solution of acetone and ethanol;
- electroplating the stainless-steel mesh in a copper solution to form a copper coating on the surface of the stainless-steel mesh;
- treating the copper-coated stainless-steel mesh with an oxidizing solution, wherein an oxidizing potential is applied in the oxidizing solution;
- washing the copper-coated stainless-steel mesh with water and drying the copper-coated stainless-steel mesh;
- immersing the copper-coated stainless-steel mesh in a lauric acid solution;
- rinsing the copper-coated stainless-steel mesh with ethanol to remove adsorbed lauric acid; and
- drying the copper-coated stainless-steel mesh,
- wherein the hydrophobic mesh comprises hydrophobic branches of lauric acid, and wherein the oxidizing solution consists of 0.03M $K_2SO_4$ and 1M KOH.

\* \* \* \* \*